United States Patent [19]
Bailey

[11] 3,883,516
[45] May 13, 1975

[54] PYRROLE-2-CARBOXALDEHYDE DERIVATIVES

[75] Inventor: Denis M. Bailey, East Greenbush, N.Y.

[73] Assignee: Sterling Drug, Inc., New York, N.Y.

[22] Filed: Apr. 11, 1973

[21] Appl. No.: 349,972

[52] U.S. Cl. ............ 260/240 G; 424/273; 424/274; 260/326.3; 260/326.5 J
[51] Int. Cl. ................................... C07d 27/22
[58] Field of Search ................ 260/240 G, 326.5 J

[56] References Cited
OTHER PUBLICATIONS

Beilstein's Handbuch der Organischen Chemie. Vol. 21 (Einundzwanzigster Band), Mainwerke, system No. 3181, pages 270 to 271 and frontispage, Verlag von Julius Springer, Berlin, Germany (1935).

Jaureguiberry et al., Comptes Rendus, Vol. 273, pages 276–277, Series C (July 19, 1971).

Anderson et al., Canadian Journal of Chemistry, Vol. 43, pages 409 to 414 (1965).

Hodge et al., Journal of the Chemical Society (London), 1965, pages 459 to 470.

Motekaitis et al., J. Org. Chem. Vol. 35, pages 2504 to 2511 (1970).

*Primary Examiner*—John D. Randolph
*Attorney, Agent, or Firm*—William G. Webb; B. W. Wyatt

[57] ABSTRACT

4,5-Dihalopyrrole-2-carboxaldehyde derivatives, prepared by reaction of a 4,5-dihalopyrrole-2-carboxaldehyde with an appropriate carbonyl reactive compound, have antibacterial activity.

12 Claims, No Drawings

PYRROLE-2-CARBOXALDEHYDE DERIVATIVES

This invention relates to 4,5-dihalopyrrole-2-carboxaldehyde derivatives having the formula:

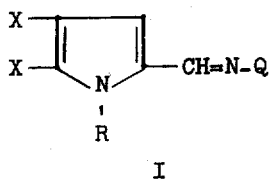

wherein X is chlorine, bromine or iodine, both values of X being identical; R is hydrogen or lower-alkyl; Q is hydroxy (—OH), ureido (—NHCONH$_2$), thioreido (—NHCSNH$_2$) or 1-hydantoinyl, i.e.

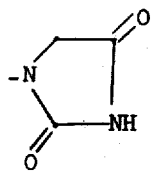

As used herein, the term "lower-alkyl" means saturated, monovalent, aliphatic radicals, including straight or branched-chain radicals, of from one to four carbon atoms, as illustrated by, but not limited to, methyl, ethyl, propyl, isopropyl, butyl, sec.-butyl, isobutyl, and the like.

The compounds of formula I where R is lower-alkyl are prepared by reaction of a 4,5-dihalopyrrole-2-carboxaldehyde of formula IIa with a lower-alkyl halide, followed by reaction of the resulting 4,5-dihalo-1-lower-alkylpyrrole-2-carboxaldehyde of formula IIb with an appropriate carbonyl reactive compound, that is, hydroxylamine, semicarbazide, thiosemicarbazide, or 1-aminohydantoin. The compounds of formula I where R is hydrogen are prepared by direct reaction of a 4,5-dihalopyrrole-2-carboxaldehyde with the desired carbonyl reactive compound. The methods are represented by the following reaction sequence:

wherein X, R and Q have the meanings given above, and X' represents halogen. The alkylation of the 4,5-dihalopyrrole-2-carboxaldehyde with a lower-alkyl halide is carried out in an organic solvent, for example dimethylformamide, acetone, ethanol, isopropanol, and the like, and in the presence of an acid acceptor, for example sodium or potassium carbonate. The reaction is advantageously carried out at the reflux temperature of the reaction mixture.

The reaction of the 4,5-dihalopyrrole-2-carboxaldehydes of formulas IIa and IIb with hydroxylamine, semicarbazide, thiosemicarbazide, or 1-aminohydantoin is carried out in an organic solvent, for example methanol, ethanol, isopropanol, or glacial acetic acid, preferably at the reflux temperature of the mixture.

The 4,5-dihalopyrrole-2-carboxaldehydes of formula IIa are in turn prepared by direct halogenation of pyrrole-2-carboxaldehyde with chlorine (or sulfuric oxychloride) or bromine (to prepare the compounds of formula IIa where X is chlorine or bromine) or with iodine monochloride (to prepare the compounds of formula IIa where X is iodine). The halogenation reaction is carried out at a temperature in the range from about 0°C. to about 20°C., and in an organic solvent inert under the conditions of the reaction, for example glacial acetic acid, chloroform, carbon tetrachloride, methylene dichloride, ethylene dichloride, and the like.

Alternatively, the 4,5-dihalopyrrole-2-carboxaldehydes of formula IIa are prepared by reaction of a corresponding 4,5-dihalopyrrole-2-carbonitrile (which are disclosed in my prior compending application Ser. No. 195,817, filed Nov. 4, 1971) with formic acid in the presence of a Raney nickel catalyst. Reaction takes place after short refluxing of the various, above mentioned reactants.

The compounds of formula I have been found to possess antibacterial activity. The antibacterial activity was determined using a modification of the Autotiter method described by Goss, et al., Applied Microbiology, 16 (No. 9), 1,414–1,416 (1968) in which a 1,000 mcg./ml. solution of the test compound is prepared. To the first cup of the Autotray is added 0.1 ml. of the test solution. Activation of the Autotiter initiates a sequence of operations by which 0.05 ml. of the test com-

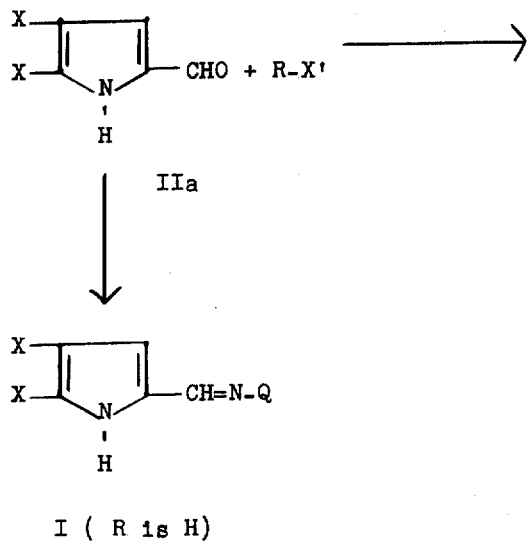

I (R is H)

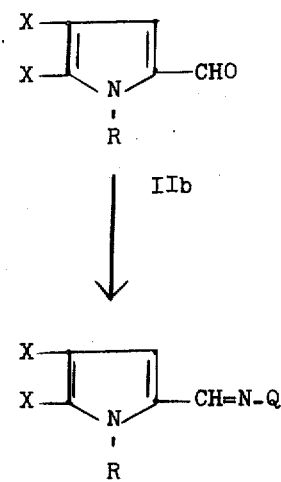

I (R is lower-alkyl)

pound solution is withdrawn from this cup by a Microtiter transfer loop and diluted in 0.05 ml. of sterile semisynthetic medium (glucose). After this operation, 0.05 ml. of inoculated semisynthetic medium is added automatically to each cup. The overall operation results in final drug concentrations ranging from 500 to 0.06 mcg./ml. in twofold decrements. The Autotray is incubated for 18–20 hours at 37°C., at which time the trays are examined visually for growth as evidenced by turbidity, and the concentration of the last sample in the series showing no growth (or no turbidity) is recorded as the minimal inhibitory concentration (MIC). The compounds of formula I were thus found to be antibacterially effective against *Staphylococcus aureus*, *Pseudomonas aeruginosa*, *Escherichia coli*, and *Proteus vulgaris* at concentrations from 2 to 500 mcg./ml.

The actual determination of the numerical biological data definitive for a particular compound of formula I is readily determined by standard test procedures by technicians versed in biological test procedures, without the need for any extensive experimentation.

When used as antibacterial agents, the compounds of formula I can be formulated for use by preparing a dilute solution in an organic medium in which the compounds are soluble, for example ethyl alcohol or in such solution containing a surfactant, and are applied to a surface to be disinfected by conventional methods such as spraying, swabbing, immersion, and the like. Alternatively, the compounds can be formulated as ointments or creams by incorporating them in conventional ointment or cream bases, for example alkylpolyether alcohols, cetyl alcohol, stearyl alcohol, and the like, or as jellies, by incorporating them in conventional jelly bases such as glycerol and tragacanth. They can also be formulated for use as aerosol sprays or foams.

The molecular structures of the compounds of the invention were assigned on the basis of study of their infrared, ultraviolet, and NMR spectra, and confirmed by the correspondence between calculated and found values for elementary analyses for the elements.

The following examples will further illustrate the invention without, however, limiting it thereto. All melting points are uncorrected.

EXAMPLE 1

A mixture of 25.0 g. (0.1 mole) of 4,5-dibromopyrrole-2-carboxaldehyde [Anderson, et al., Can. J. Chem. 43, 409 (1965)] and 10.5 g. (0.15 mole) of hydroxylamine hydrochloride in 100 ml. of ethanol was heated to boiling, cooled slowly, and treated with a solution of 14 g. (0.1 mole) of potassium carbonate in 100 ml. of water. The mixture was concentrated to a small volume, diluted with water, and the brown precipitate which separated was collected and recrystallized, with charcoaling, from an ethanol/water mixture giving 17 g. of 4,5-dibromopyrrole-2-carboxaldehyde oxime, m.p. 146–148°C.

EXAMPLE 2

A mixture of 18.0 g. (0.07 mole) of 4,5-dibromopyrrole-2-carboxaldehyde, 11.1 g. (0.1 mole) of semicarbazide hydrochloride and 9.0 g. (0.11 mole) of sodium acetate in 50 ml. of ethanol and 50 ml. of water was heated under reflux for thirty minutes, cooled to room temperature, diluted with about 200 ml. of water, and the solid which separated was collected and recrystallized from an ethanol/water mixture to give 16.2 g. of 4,5-dibromopyrrole-2-carboxaldehyde semicarbazone, m.p. 204°–205°C.

EXAMPLE 3

A mixture of 10 g. (0.04 mole) of 4,5-dibromopyrrole-2-carboxaldehyde and 3.6 g. (0.04 mole) of thiosemicarbazide in 50 ml. of glacial acetic acid was heated on a steam bath with stirring for 30 minutes. The mixture was then poured into 250 ml. of water, and the solid which separated was collected and recrystallized from dilute ethanol with charcoaling to give 7.3 g. of 4,5-dibromopyrrole-2-carboxaldehyde thiosemicarbazone, m.p. >185°C. (dec.).

EXAMPLE 4

1-Aminohydantoin (7.7 g., 0.05 mole), prepared by the procedure described by Jack, J. Pharm. and Pharmacol. 11, Suppl. 108T (1959), was dissolved in a mixture of 75 ml. of water and 75 ml. of ethanol, and the solution treated with a solution of 12.7 g. (0.05 mole) of 4,5-dibromopyrrole-2-carboxaldehyde in 25 ml. of hot ethanol. The solid material which separated almost immediately from the reaction mixture was collected and recrystallized from a 1:1:1 mixture of dimethylformamide/ethanol/water to give two crops of product totaling 8.3 g. of 1-[(4,5-dibromopyrrol-2-ylidene)amino]hydantoin, m.p. >250°C.

EXAMPLE 5

A mixture of 20 g. (0.08 mole) of 4,5-dibromopyrrole-2-carboxaldehyde, 36 g. (0.26 mole) of potassium carbonate and 22.7 g. (0.16 mole) of methyl iodide in 300 ml. of acetone was stirred and heated under reflux for 30 minutes, cooled, concentrated to a small volume, diluted with about 300 ml. of water, and the mixture extracted with diethyl ether. The combined ether extracts were dried, charcoaled, and taken to dryness giving a residue which was recrystallized from hexane to give 17.8 g. of 4,5-dibromo-1-methylpyrrole-2-carboxaldehyde, m.p. 118°–120°C.

A mixture of 14.6 g. (0.055 mole) of 4,5-dibromo-1-methylpyrrole-2-carboxaldehyde and 5 g. (0.055 mole) of thiosemicarbazide in 50 ml. of glacial acetic acid was heated and stirred on a stream bath for about 30 minutes and then cooled. The solid which separated was collected and recrystallized with charcoaling from a pyridine/diethyl ether mixture to give 9.4 g. of 4,5-dibromo-1-methylpyrrole-2-carboxaldehyde thiosemicarbazone, m.p. chars >180°C.

By replacement of the methyl iodide used in the above described procedure with a molar equivalent amount of ethyl iodide, propyl iodide, isopropyl iodide, butyl iodide, sec.-butyl iodide or isobutyl iodide, there can be obtained, respectively, 4,5-dibromo-1-ethylpyrrole-2-carboxaldehyde thiosemicarbazone; 4,-5-dibromo-1-propylpyrrole-2-carboxaldehyde thiosemicarbazone; 4,5-dibromo-1-isopropylpyrrole-2-carboxaldehyde thiosemicarbazone; 4,5-dibromo-1-butylpyrrole2-carboxaldehyde thiosemicarbazone; 4,5-dibromo-1-sec.-butylpyrrole-2-carboxaldehyde thiosemicarbazone; or 4,5-dibromo-1-isobutylpyrrole-2-carboxaldehyde thiosemicarbazone.

EXAMPLE 6

A mixture of 5 g. (0.03 mole) of 4,5-dichloropyrrole-2-carbonitrile and 5 g. of Raney nickel catalyst in 75 ml. of 75% aqueous formic acid was heated under reflux for an hour, cooled, and filtered through filter aid. The filtrate was diluted with 200 ml. of water, the mixture extracted with diethyl ether, and the combined ether extracts were washed with saturated sodium bicarbonate until the aqueous washes were basic. Evaporation of the organic layer to dryness and recrystallization of the solid residue from a diethyl ether/hexane mixture afforded 3.4 g. of 4,5-dichloropyrrole-2-carboxaldehyde, m.p. 140°-142°C.

A mixture of 10 g. (0.06 mole) of 4,5-dichloropyrrole-2-carboxaldehyde and 5.6 g. (0.06 mole) of thiosemicarbazide in 50 ml. of glacial acetic acid was heated and stirred on a steam bath for 30 minutes and then cooled. The solid which had separated was collected, dried, and recrystallized from an ethanol/water mixture to give two crops totaling 8.5 g. of 4,5-dichloropyrrole-2-carboxaldehyde thiosemicarbazone, m.p. chars >180°C.

EXAMPLE 7

Reaction of 4,5-dichloropyrrole-2-carboxaldehyde with methyl iodide, ethyl iodide, propyl iodide, isopropyl iodide, butyl iodide, sec.-butyl iodide or isobutyl iodide in the presence of potassium carbonate using the procedure described above in Example 5, and reaction of the resulting 4,5-dichloro-1-lower-alkyl-2-carboxaldehyde with thiosemicarbazide using the procedure described above in Examples 3, 5 or 6 affords, respectively, 4,5-dichloro-1-methylpyrrole-2-carboxaldehyde thiosemicarbazone; 4,5-dichloro-1-ethylpyrrole-2-carboxaldehyde thiosemicarbazone; 4,-5-dichloro-1-propylpyrrole-2-carboxaldehyde thiosemicarbazone; 4,5-dichloro-1-isopropylpyrrole-2-carboxaldehyde thiosemicarbazone; 4,5-dichloro-1-butylpyrrole-2-carboxaldehyde thiosemicarbazone; 4,-5-dichloro-1-sec.-butylpyrrole-2-carboxaldehyde thiosemicarbazone; or 4,5-dichloro-1-isobutylpyrrole-2-carboxaldehyde thiosemicarbazone.

EXAMPLE 8

Reaction of 4,5-dichloropyrrole-2-carboxaldehyde with semicarbazide using the procedure described above in Example 2 affords 4,5-dichloro-2-carboxaldehyde semicarbazone.

EXAMPLE 9

Reaction of 4,5-dichloropyrrole-2-carboxaldehyde with hydroxylamine using the procedure described above in Example 1 affords 4,5-dichloropyrrole-2-carboxaldehyde oxime.

EXAMPLE 10

Reaction of 4,5-dichloropyrrole-2-carboxaldehyde with 1-aminohydantoin using the procedure described above in Example 4 affords 1-]( 4,5-dichloropyrrol-2-ylidene)amino]hydantoin.

EXAMPLE 11

Reaction of a warm solution of pyrrole-2-carboxaldehyde in glacial acetic acid with an aqueous solution of sodium chloride/iodine monochloride affords, 4,5-diiodopyrrole-2-carboxaldehyde.

Reaction of the latter with methyl iodide, ethyl iodide, propyl iodide, isopropyl iodide, butyl iodide, sec.-butyl iodide or isobutyl iodide in acetone in the presence of potassium carbonate using the procedure described above in Example 5, and reaction of the resulting 4,5-diiodo-1-lower-alkylpyrrole-2-carboxaldehyde with thiosemicarbazide using the procedure described above in Examples 3, 5 and 6 affords, respectively, 4,5-diiodo-1-methylpyrrole-2-carboxaldehyde thiosemicarbazone; 4,5-diiodo-1-ethylpyrrole-2-carboxaldehyde thiosemicarbazone; 4,5-diiodo-1-propylpyrrole-2-carboxaldehyde thiosemicarbazone; 4,5-diiodo-1-isopropylpyrrole-2-carboxaldehyde thiosemicarbazone; 4,5-diiodo-1-butylpyrrole-2-carboxaldehyde thiosemicarbazone; 4,5-diiodo-1-sec.-butylpyrrole-2-carboxaldehyde thiosemicarbazone; or 4,5-diiodo-1-isobutylpyrrole-2-carboxaldehyde thiosemicarbazone.

EXAMPLE 12

Reaction of 4,5-diiodopyrrole-2-carboxaldehyde with semicarbazide using the procedure described above in Example 2 affords 4,5-diiodo-2-carboxaldehyde semicarbazone.

EXAMPLE 13

Reaction of 4,5-diiodopyrrole-2-carboxaldehyde with hydroxylamine using the procedure described above in Example 1 affords 4,5-diiodopyrrole-2-carboxaldehyde oxime.

EXAMPLE 14

Reaction of 4,5-diiodopyrrole-2-carboxaldehyde with 1-aminohydantoin using the procedure described above in Example 4 affords 1-[(4,5-diiodopyrrol-2-ylidene)amino]hydantoin.

I claim:
1. A compound having the formula:

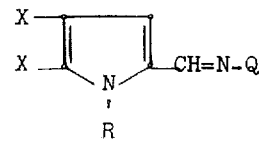

I wherein X is chlorine, bromine or iodine, both values of X being identical; R is hydrogen or lower-alkyl; and Q is hydroxy, ureido, thioureido or 1-hydantoinyl, having the structure:

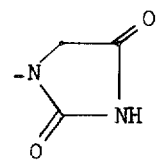

2. A compound according to claim 1 wherein R is hydrogen and Q is hydroxy.
3. A compound according to claim 1 wherein R is hydrogen and the Q is ureido.
4. A compound according to claim 1 wherein R is hydrogen and Q is thioureido.
5. A compound according to claim 1 wherein R is lower-alkyl and Q is thioureido.
6. A compound according to claim 1 wherein R is hydrogen and Q is 1-hydantoinyl.
7. 4,5-Dibromopyrrole-2-carboxaldehyde oxime according to claim 2.
8. 4,5-Dibromopyrrole-2-carboxaldehyde semicarbazone according to claim 3.
9. 4,5-Dibromopyrrole-2-carboxaldehyde thiosemicarbazone according to claim 4.
10. 4,5-Dichloropyrrole-2-carboxaldehyde thiosemicarbazone according to claim 4.
11. 4,5-Dibromo-1-methylpyrrole-2-carboxaldehyde thiosemicarbazone according to claim 5.
12. 1-[(4,5-Dibromopyrrol-2-ylidene)amino]hydantoin according to claim 6.

* * * * *